(12) United States Patent
Klemm (10) Patent No.: US 9,319,527 B2
(45) Date of Patent: Apr. 19, 2016

(54) SYSTEM AND METHOD FOR PROVIDING IMPROVED WAIT TIME ESTIMATES

(75) Inventor: Reinhard Klemm, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 74 days.

(21) Appl. No.: 13/217,958

(22) Filed: Aug. 25, 2011

(65) Prior Publication Data

US 2013/0051549 A1 Feb. 28, 2013

(51) Int. Cl.
 *H04M 3/00* (2006.01)
 *H04M 3/523* (2006.01)
 *H04M 3/42* (2006.01)

(52) U.S. Cl.
 CPC ........ *H04M 3/5238* (2013.01); *H04M 3/42059* (2013.01)

(58) Field of Classification Search
 CPC ..... H04M 3/51; H04M 3/523; H04M 3/5166; H04M 3/5238; H04M 2203/2011
 USPC ........................... 379/265.02, 266.06, 266.02
 See application file for complete search history.

(56) References Cited

U.S. PATENT DOCUMENTS

| | | | |
|---|---|---|---|
| 7,215,759 B2 | 5/2007 | Brown et al. | |
| 2004/0196856 A1* | 10/2004 | Bondarenko et al. | 370/395.52 |
| 2007/0036327 A1* | 2/2007 | Button | 379/265.01 |
| 2010/0027778 A1 | 2/2010 | Kumar et al. | |
| 2010/0036690 A1* | 2/2010 | Chafle et al. | 705/7 |
| 2010/0228628 A1* | 9/2010 | Dufour | 705/14.53 |
| 2010/0296646 A1* | 11/2010 | Hemm et al. | 379/265.02 |
| 2012/0051526 A1* | 3/2012 | Erhart et al. | 379/88.18 |
| 2012/0179552 A1* | 7/2012 | Tishkevich | G06Q 30/02 705/14.66 |
| 2012/0254312 A1* | 10/2012 | Patel | 709/204 |
| 2013/0251139 A1* | 9/2013 | Williams et al. | 379/266.02 |

* cited by examiner

*Primary Examiner* — Rasha Al Aubaidi (74) *Attorney, Agent, or Firm* — Sheridan Ross P.C.

(57) ABSTRACT

Disclosed herein are systems, methods, and non-transitory computer-readable storage media for providing estimated wait times to consumers waiting to communicate with a customer service representative. The system accesses information about the consumer, analyzes that information, and based on that analysis places the consumer into a segment. The system then provides to the consumer an estimated wait time to communicate with a customer service representative based on the segment assigned to the consumer. Access to information about the consumer can be actively granted by the consumer, or passively acquired by a system configured to utilize publically available information.

21 Claims, 7 Drawing Sheets

SYSTEM AND METHOD FOR PROVIDING IMPROVED WAIT TIME ESTIMATES

BACKGROUND

1. Technical Field

The present disclosure relates to wait time estimation and more specifically to providing customers calling into a call center an improved estimate of the expected wait time prior to the call center taking the customer's call.

2. Introduction

When a consumer engages customer service, one of the most important concerns is how long that consumer will be required to wait before actually interacting with a Customer Service Representative (CSR). For example, at the Department of Motor Vehicles (DMV), consumers can look at the line of people and decide if they want to wait in line now or come back at a different time. Many customer service organizations estimate and announce the current Estimated Wait Time (EWT) to customers as those customers begin waiting for the next available customer service agent. While at the DMV a consumer can simply look at the line of previous customers, consumers engaging with phone or on-line based customer service rely on the customer service organization to inform consumers of the EWT. This EWT announcement to the customer helps manage the customer's expectations for when the next agent will be available. For example, if the customer knows they must wait five minutes for an available agent, the customer can decide whether to keep waiting or hang up and try later. If the customer keeps waiting and the actual wait time is less than or equal to the announced wait time of five minutes, the customer experiences less disappointment or outrage if it indeed takes five minutes than if the customer had a false expectation that an agent would immediately field the call.

State of the art EWT calculations derive from current conditions and statistical data in the contact center. This calculation takes into consideration the number of operators, the number of callers already waiting in the caller queue, and statistics associated with previous calls, such as call durations and previous wait times. Despite these factors, the unique situations and characteristics of each individual caller creates wide variation in the accuracy of announced EWTs, causing some customers to become upset over what they consider an "excessive" wait time in light of the announced EWT.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for improving the accuracy of announced wait time estimates. A telephone based system configured according to this disclosure calculates an Estimated Wait Time (EWT) based on classic wait time factors, such as the number of operators, average call durations, the number of callers currently in queue, as well as additional factors. One such additional factor is the Estimated Call Duration (ECD) of each individual consumer to. ECD determinations can be produced using data acquired from or about the caller, in either an active or a passive manner.

Passive data collection can include obtaining information such as phone number, previous phone call data related to that phone number, or other information freely available to the customer service organization upon the consumer initiating a phone call. Active data collection can include obtaining information the customer service organization would normally not have access to unless the caller provides that information to the organization. For example, call centers would normally lack information regarding a caller's education, socio-economic level, or technical background, however a caller could provide this information. Likewise, callers can provide access to online social networking data. When callers actively provide this additional information, call centers can more accurately predict call durations, which in turn can yield more accurate estimated wait time announcements.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for more accurate estimated wait time announcements. A system, method and non-transitory computer-readable media are disclosed which provide more accurate estimates of the wait times associated with a consumer contacting a customer service organization. A brief introductory description of a basic general purpose system or computing device in FIG. 1 which can be employed to practice the concepts is disclosed herein. A more detailed description of how the EWT improves in accuracy will then follow. The disclosure now turns to FIG. 1.

Figure 1:
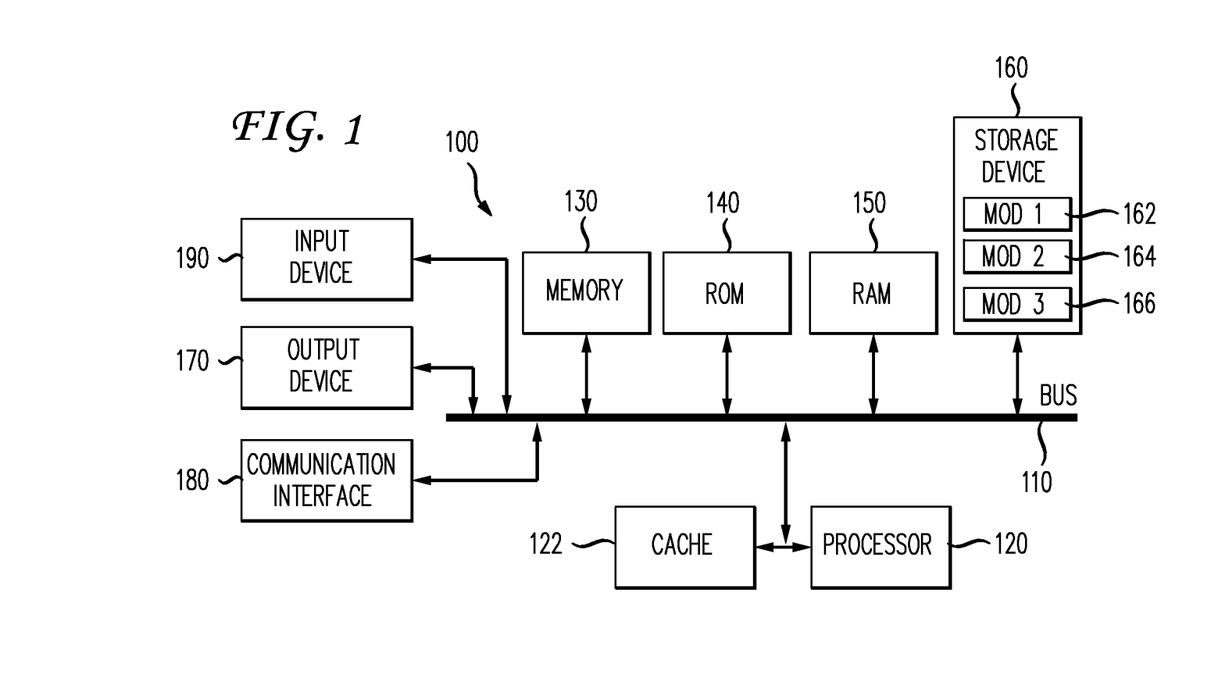
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations. A system 100 shown in FIG. 1 can be configured to receive data and provide estimated wait times to a caller, and will be referenced as such throughout the remainder of this disclosure.

Figure 2:
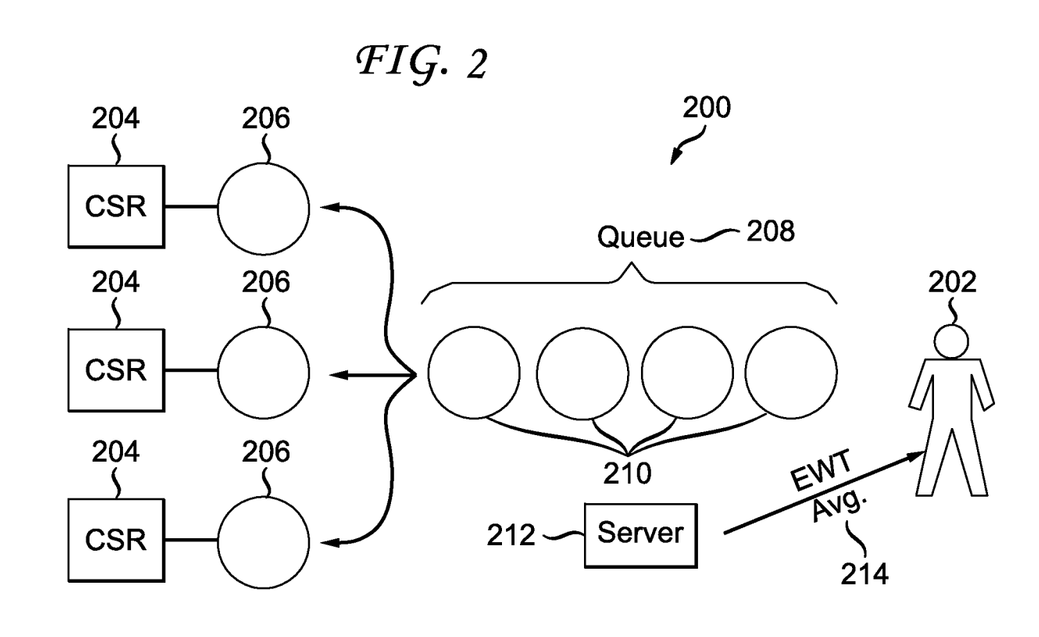
FIG. 2 illustrates an example call center with a queue.

Having disclosed some components of a computing system 100, the disclosure now turns to FIG. 2, which illustrates an example call center 200 with a queue 208. Although this disclosure applies equally to telephone based, Internet based, or other consumer service organizations, for simplicity all will be discussed with reference to a telephone based consumer service organization, otherwise referred to as a call center. While each call center can have unique attributes and configurations, the depicted call center 200 illustrates standard features found in most call centers. A caller 202 calls the call center 200 and takes a place at the end of a queue 208 of callers 210. This queue 208 of callers 210 are those individuals who called the call center 200 prior to the caller 202 and are waiting to speak with a customer service representative (CSR) 204. The call center 200 assigns callers 206 who have waited through the queue 208 to CSRs 204.

As each of the callers currently conversing 206 with the CSRs 204 finish their conversations, a server 212 or other computer system 100 configured to calculate EWT receives the actual amount of time that each caller 206 spent conversing with the CSR 204. The system 100 records this duration and uses it to calculate the average duration of all calls received. Because this average duration changes with each phone call, the server 212 can repeatedly recalculate the average to form a rolling average. The server 212 uses this rolling average, coupled with the number of other callers already in the queue 208, the number of CSRs 204, and the predicted-time remaining for any callers currently being assisted 206, to announce to the most recent caller 202 the EWT 214 calculated based on the average duration. In other variations, the system uses previously established guidelines instead of or in conjunction with a rolling average to estimate call duration (ECD) for individuals in a queue and to calculate the EWT.

In one embodiment, a system 100 configured according to this disclosure improves upon the call center of FIG. 2 by estimating call duration for each individual caller based on specific information about that caller, and providing to each individual caller a more accurate EWT based in part upon the ECDs of those callers 210 waiting in the queue 208 and/or the callers 206 currently speaking with CSRs 204. To estimate the call duration of each caller, the system 100 can utilize both passive data collection and active data collection. Passive data collection can include information made available to the call center when receiving a phone call, or data easily obtained without the caller's permission. Examples of passive data collection can include obtaining the caller's phone number, the duration of previous phone calls by this caller to the call center, and other information readily accessible to this particular call center. Passive data collection in this context can include data that are actively gathered from the user, but for a different purpose, such as prompting the user for their home phone number, product serial number, product type, name, and/or ticket number. Each of these pieces of data can provide some amount of insight into an estimated call duration for that user. Passive data collection can include fetching account or history information associated with a particular caller, that may include some information previously gathered using active data collection. Active data collection can include obtaining information associated with the caller which one would generally need the permission of the caller to access. Examples of active data collection can include obtaining socioeconomic data, education, technical background, emotional status, marital status, driving record, credit report, and social networking and microblog data. This data may reveal information such as favorite brands, activities, pastimes, the number of Twitter® followers, level of talkativeness, technical ability, and/or prejudices against brands, people, or services.

In one example utilizing both passive and active data collection, a caller calls the customer service center for a national clothing store. The customer service center engages in passive data collection by obtaining the phone number the caller is using to call, accessing the call center server and accessing information about the previous phone calls associated with that number. By engaging in passive data collection the call center now has information about previous phone calls and the durations of those calls. If other information is retained in the call center server, the previous topic area or complaint may be known as well. The customer service center can optionally engage in active data collection by requesting permission from the caller to access the caller's Facebook® account. If the caller allows the access, the call center can collect data concerning language preference, gender, education, socio-economic background, race, age, and many other factors which can be used to provide an improved ECD. The data collection can also reveal more dynamic aspects of the user such as location, attitudes, interests, friends, and affiliations, to complement more static aspects such as gender or language preference. If, for example, access to the caller's Facebook® account reveals that the caller's language preference is Spanish but currently no Spanish-speaking operator is available, this caller's ECD can be expected to be longer than the average ECD. If further analysis of the caller's Facebook® page reveals that the caller frequently and irately complains about the business' products and services in long rambling postings, this caller's ECD can become even longer, thus also increasing the EWT for later callers in the caller queue.

Depending on the call center, data normally acquired through active data collection can be acquired passively. For example, if the caller calls their phone carrier, the phone carrier should have access to the fact that the phone number associates with a cell phone, and that the caller have very few minutes remaining on their calling plan. The phone carrier can also have access to cell phone tower data, know that the caller is on the move, or is simultaneously accessing the Internet via a smartphone.

In addition, callers can provide access to private information on a one-time basis, a limited-time recurring basis, and/or on a permanent basis. In certain embodiments, once a caller has provided private information to a call center, that private information is available for other analysis beyond ECD calculations. Callers can also provide access across modalities. For example, if a caller had previously granted socio-economic background access to a phone carrier via the Internet, that same caller, upon calling the customer service organization of that phone carrier, will have already granted access to the data. Similarly, if a caller has granted access to that socio-economic data via a telephone call, upon engaging in a technical support chat with the same organization over the Internet, that organization can retain access to the socio-economic data. Callers can also go on-line to a website, for example, to implement permissions and restrictions on when data can be collected, what data can be collected, and how that data can be used. For example, if the caller wishes the information to be used only in the current instance, and not for future calls, they may so indicate. The caller can indicate that collected information be deleted after a certain amount of time.

Figure 3:
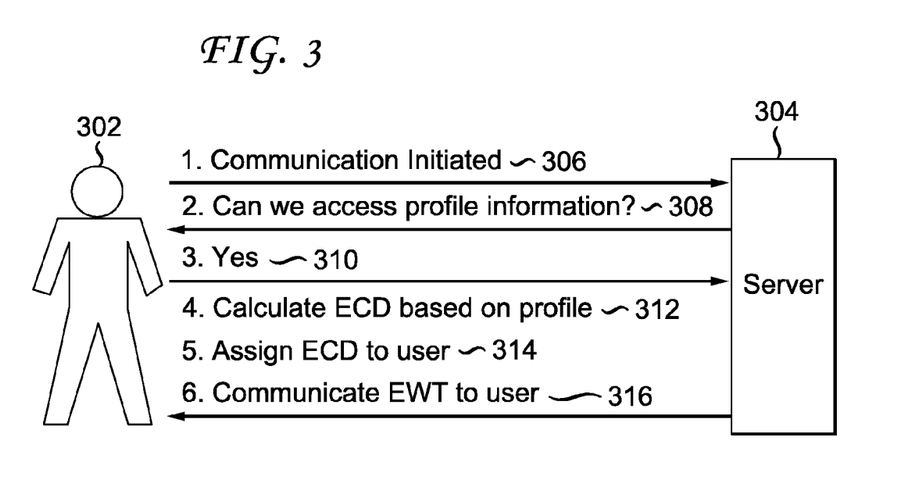
FIG. 3 illustrates an example exchange between a user and a server to obtain profile information.

FIG. 3 illustrates an example exchange between a user 302 and a server 304 to obtain profile information. FIG. 3 represents an active data collection process, rather than a passive data collection process. The caller 302 initiates a communication 306 with a server 304, or other type of computing device. The server 304 in turn receives the communication, and asks permission 308 of the caller 302 to access profile information. This profile information can be stored on a separate network, the Internet, or can be iteratively entered in a near-real time manner by the caller 302, for example. The manner of input of the profile information can be based on the type of communication initiated. For example, if the communication is a telephone call, the user 302 can provide the information via DTMF tones (i.e. pressing certain numbers on the telephone key pad) or natural language input to a speech recognizer, whereas if the communication is a video call, the user can provide input via facial expressions or other gestures. If the caller 302 replies that the server 304 may access the profile information, the server 304 then accesses, retrieves, and analyzes the profile information. Based on this analysis, the server 304 calculates a ECD 312, which can be a specific amount of time, such as 8.3 minutes, or a range of time, such as 8 to 10 minutes. The server assigns 314 the calculated ECD to the caller 302. Then the server 304 places the user 302 in to a queue, and, based on the ECD for each of the callers ahead of the user in the queue, the server 304 communicates to the caller 302 an estimated wait time 316. In certain embodiments, this exchange occurs every time a call is made, whereas in other embodiments a caller 302 can provide a one-time permission to access profile information for future communications.

Because users may hesitate to disclose private profile information with no direct, immediate, personal benefit, call centers can establish separate queues for those who opt not to permit access to profile information. Call centers can then provide an immediate benefit to the caller for permitting access, or conversely provide a detriment to those who prefer not to share the information, that immediate benefit being a more accurate estimate of wait time in the queue. For example, a call center may assign multiple CSRs to assist those that provide access to private or restricted data, and only a single CSR to assist all other callers. Similarly, call centers may provide discounts or coupons to those customers who are willing to provide access to private data. Call centers may refrain from disclosing EWTs to callers unless callers provide access to otherwise restricted information. Alternatively, the call center can gently urge callers to share the information in order to provide a more accurate estimate of the wait time.

Certain organization policies may prohibit requesting information about the callers, thereby negating the possibility of active data collection. Where the system does not actively gather private data, whether such denial of information is due to caller preference, law, or internal regulation, the system can still continue to estimate call duration based on passively collected data without the caller's permission and without access to restricted access data. For example, the call center can retain information about the frequency of specific phone numbers, the actual call durations associated with those phone calls, and themes or attitudes present in those calls. When that phone number again contacts the customer service organization that customer service organization can calculate an ECD for the caller based on the previously retained information.

Figure 4:
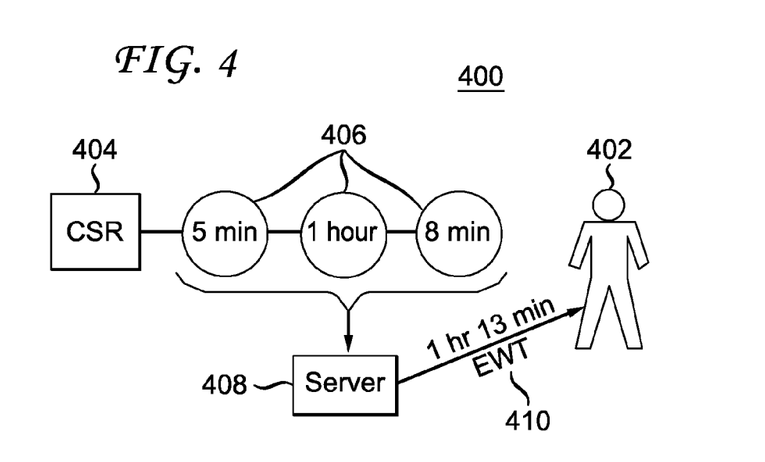
FIG. 4 illustrates an example call center with a queue, where each caller has an estimated call duration assigned.

FIG. 4 illustrates an example call center 400 with a queue 406, where each caller has an ECD assigned. This simple example call center 400 includes a single CSR 404. A caller 402 calls into the center 400. The call center places this new caller 402 at the end of the queue, behind all of the previous callers 406. These previous callers 406 have respective ECDs of 5 minutes, 1 hour, and 8 minutes, which the Server 408 analyzes, sums to a total of 1 hour 13 minutes, adds an estimated remaining time for resolving the current interaction with the CSR 404, and announces to the caller 402 an EWT 410. As the system gathers additional information, or as conditions in the queue change, the system can update the EWT for each caller affected by the change. For example, if the third person in the queue decides that the wait time is too long and drops out of the queue, the system can update the EWT for caller 402 and notify caller 402 accordingly. Afterwards, if the initially available information about the middle caller in the queue is augmented with additional information pulled from a social network or from another source, then the 1 hour estimate can be revised down to 24 minutes. Then the system can update the EWT for everyone after that middle caller accordingly and provide notifications. The system can provide the notifications audibly, such as via a synthesized spoken voice, and/or via other modalities.

Figure 5A:
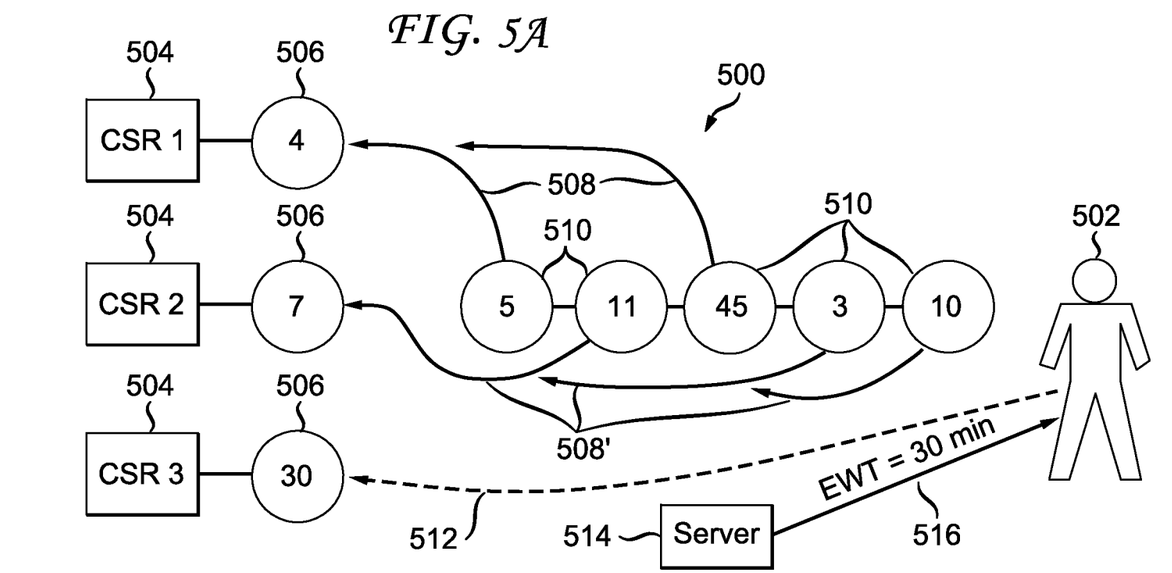
FIGS. 5A and 5B illustrate an example call center with estimated call durations assigned to callers, and an example of calculations to predict estimated wait time.

FIG. 5A illustrates an example call center 500 similar to that of FIG. 4, but with multiple CSRs 504. In FIG. 5A, a caller 502 calls in to the call center 500 and takes a place at the end of the queue of previous callers 510. Each of these previous callers 510 has an ECD assigned to them, which the Server 514 uses to calculate the EWT 516 announced to the caller. In this present case, there are three CSRs 504 currently speaking with three previous callers 506 whose predicted remaining call times are 4, 7, and 30 minutes. The Server 514 then predicts where the remaining callers in the queue 510 will go and creates a plan for which CSR 504 will receive each particular waiting caller 502, 510.

Figure 5B:
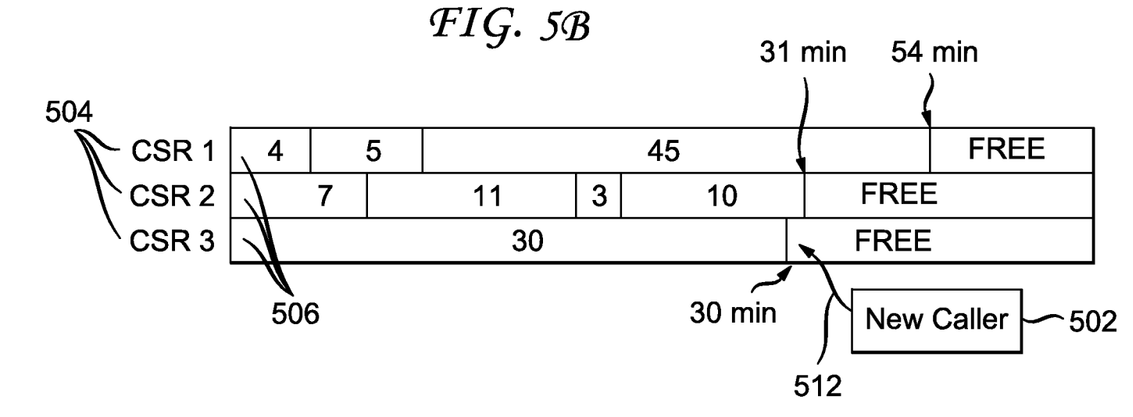

FIG. 5B illustrates an exemplary plan, with corresponding assignments 508 shown in FIG. 5A. In FIG. 5B, the ECD of each caller is aligned with each CSR 504 in the order they are predicted to begin speaking with the CSR. The callers currently speaking 506 with the CSRs 504 in FIG. 5A similarly are shown at the front of each CSR line 518 in FIG. 5B.

Walking through the process the server 514 uses to calculate the EWT for the new caller 502 using FIG. 5B, we see that CSR1 will likely finish with the current caller in 4 minutes, so the next caller in the queue, with an ECD of 5 minutes, will likely be assigned to CSR1. Then CSR2 will likely finish with the current caller in 7 minutes, so the 2nd caller in the queue will likely be assigned to CSR2. The third caller in the queue, with an ECD of 45 minutes, is predicted to be assigned to CSR1 when CSR1 finishes with the present caller (4 minutes) and the first caller in the queue (ECD=5 minutes), and therefore has a remaining wait time of 9 minutes. Following this same process for the remaining callers in the queue, the system 100 predicts both the fourth and fifth callers will be helped by CSR2. Based on these predictions, CSR1 will be free in 54 minutes, CSR2 will be free in 31 minutes, and CSR3 will be free in 30 minutes. The server 514 records these predictions 512 and reports 30 minutes as the EWT 516 to the new caller 502.

Figure 6:
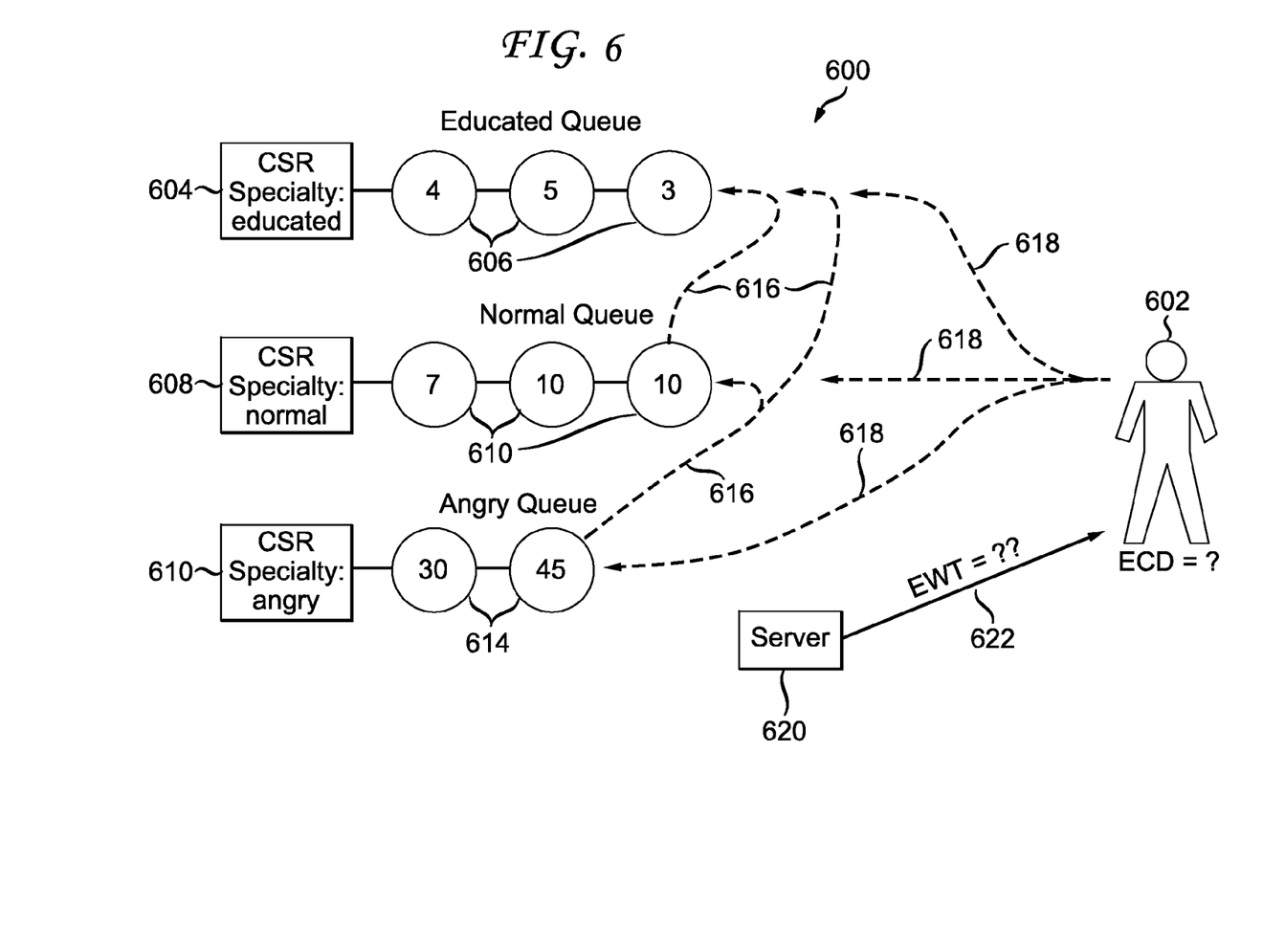
FIG. 6 illustrates an example call center with specialized queues, estimated call durations assigned to callers, and multiple customer service representatives.

FIG. 6 illustrates an example call center 600 with specialized queues, estimated call durations assigned to callers, and multiple customer service representatives. Similar to FIG. 5A, the call center 600 has assigned ECDs to each of the previous callers 606, 610, 614 to the call center 600. Unlike FIG. 5A, in this embodiment individual callers receive assignments to specific queues based on specific qualities derived from the caller profile. In the shown embodiment, each CSR has a specialty. CSR1 604 is assigned educated callers, CSR2 608 is assigned normal or typical callers, and CSR3 612 is assigned angry callers. In certain embodiments, these assignments could be based on the particular skills of each CSR, assigned based on past performance, assigned based on manager preference, or randomly assigned. In other embodiments, these assignments could vary depending on unique circumstances. For example, if an organization ran a promotion, but only the first ten callers could receive the promotion, a queue could develop that only had ten openings, after which all other callers are diverted to other queues. As another example, if a software company became aware of a specific issue that occurred every Friday, they could organize a queue to receive those calls only on Fridays.

In one embodiment of these specialized queues, once a caller receives assignment to a specific queue they will be required to wait through that queue regardless of openings in the other queues. For example, an organization running the call center 600 could determine that it is in the best interest of the call center 600 to send all angry callers to a particular CSR 612 who specializes in angry callers, and therefore will create a queue for that CSR. In other embodiments, callers assigned to a queue could be transferred 616 to a CSR with a different specialty. This transfer could occur based on a specialized queue being completely empty, based on updating the profile data, or based on a reduced amount of people in that queue. A new caller 602 receives assignment 618 to a particular queue based on the profile data analysis performed by the server 620, which will also announce to the caller 602 the EWT 622.

The profile data received can lead to a wide variety of queue types. Beyond the three shown in FIG. 6, other specialized queue types assign callers based on the number of friends in one's social network, number of minutes remaining on a cell phone plan, the caller's previous call durations, how many Twitter® or other microblog followers an individual has, number of purchases made, amount of money spent at a particular store or within a certain amount of time, or particular languages or dialects. Queues can exist based on the ECDs, such that all the callers with long ECDs go to the same CSR, and callers with short ECDs go to a different CSR. In certain embodiments, there can exist a mix of various queue types, with a standard queue for most callers, and a specialized queue for uniquely identified callers.

Figure 7:
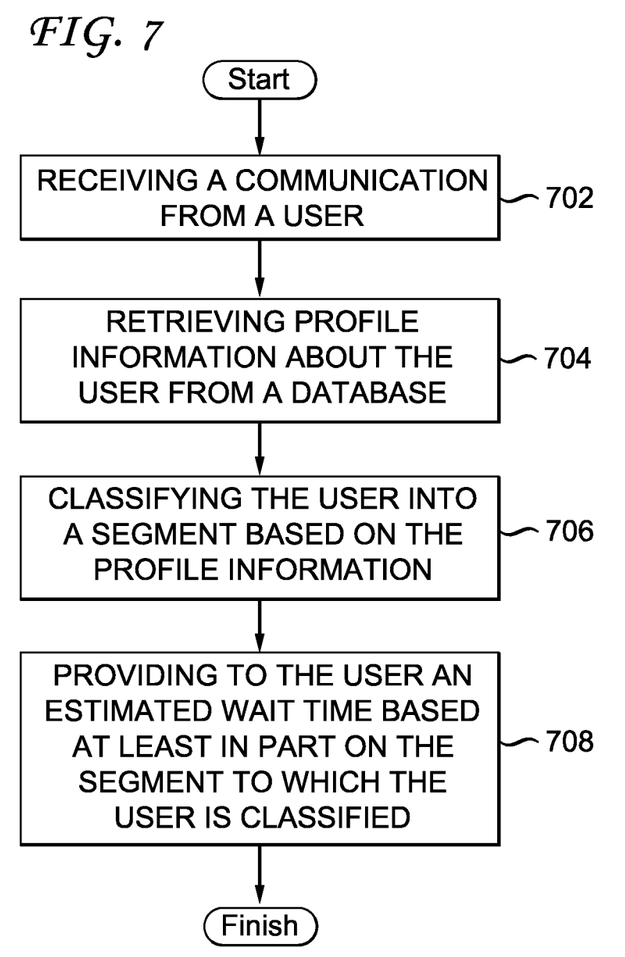
FIG. 7 illustrates an example method embodiment.

Having disclosed some basic system components and concepts, the disclosure now turns to the exemplary method embodiment shown in FIG. 7. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

A system 100 so configured receives an incoming communication from a user (702). This communication can be a telephone call, a request for a text-based chat, a video-conference or video communication, or any other form of two-way, near real-time communication. The incoming call can be associated with a communications queue, such as a queue to speak with a customer service representative. The system can place the call from the user into the communications queue. The system 100 then retrieves profile information about the user from a database (704). Profile information, such as the duration of the user's previous communications, a phone number associated with the communication if the communication is a phone call, can be associated with a database associated with the system 100, or associated with a database linked to the manner of communication. Alternatively, profile information can be obtained from a database requiring active permissions from the user, such as accessing the user's social networking profile to obtain information about the user. The system 100 then uses this profile information to classify the user into a segment based on the profile information (706). In certain embodiments, this segment can take the form of a specific type, or class, of individual and can result in different queues or orders based on those types or classes. In other embodiments, this segment takes the form of estimated call duration. The system then provides to the user an estimated wait time based at least in part on the segment to which the user is classified (708). If the segment takes the form of estimated call durations, the announced estimated wait time can be based on the user's estimated call duration, or the estimated call durations of other previous callers. If the segment takes the form of separate queues, the associated estimated wait time can be based on the estimated call durations of those individuals in front of the user in the assigned queue.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to call centers, text-based chat systems, and email response queues. Those skilled in the art will readily recognize various modifications and changes that may be made to the principles described herein without following the example embodiments and applications illustrated and described herein, and without departing from the spirit and scope of the disclosure.

We claim:
1. A method comprising:
receiving, at a service center, an incoming communication from a device, the incoming communication regarding a product;

transmitting, to the device, a request for a permission to access information from a social network about a user associated with the device, to yield a permission determination;

when the permission determination indicates an approval:
retrieving, from the social network, the information about the user;
analyzing the information to determine whether the user has a negative attitude towards the product and frequently complains about the product on the social network, to yield an analysis;
when the analysis indicates that the user has the negative attitude towards the product, placing future communications with the device in a specialized communications queue selected among a plurality of specialized communications queues, the specialized queue corresponding to a segment of estimated communication durations; and
providing to the device a first estimated wait time for the specialized communications queue based on the segment; and when the permission determination indicates a disapproval:
placing the future communications with the device in a queue separate from the plurality of specialized communication queues; and
providing to the device a second estimated wait time for the queue, the second estimated wait time being less accurate than the first estimated wait time.

2. The method of claim 1, wherein the incoming communication is one of a telephone call, a video chat, an instant messenger chat, and an email.

3. The method of claim 1, wherein the information comprises data from the social network regarding at least one of language preference, gender, education, socio-economic background, race, or age of the user.

4. The method of claim 1, wherein providing the estimated wait time is further based on estimated call durations for other callers in the specialized communications queue.

5. The method of claim 1, wherein, in response to the request, the permission is provided by the user via at least one of a dual-tone multi-frequency tone, a natural language input, a facial expression, or a gesture.

6. The method of claim 1, wherein the plurality of specialized communications queues is associated with one of age, technical sophistication, emotional state, previous communication duration, education, and language preference.

7. The method of claim 1, wherein the device is placed in the specialized communications queue further based on data collected from a previous communication.

8. The method of claim 1, wherein the segment is associated with a customer service representative.

9. A system comprising:
a processor; and
a computer-readable storage device storing instructions which, when executed by the processor, cause the processor to perform operations comprising:
receiving, at a service center, an incoming communication from a device, the incoming communication regarding a product;
transmitting, to the device, a request for a permission to access information from a social network about a user associated with the device, to yield a permission determination;
when the permission determination indicates an approval:
retrieving, from the social network, the information about the user;
analyzing the information to determine whether the user has a negative attitude towards the product and frequently complains about the product on the social network, to yield an analysis;
when the analysis indicates that the user has the negative attitude towards the product, placing future communications with the device in a specialized communications queue selected among a plurality of specialized communications queue, the specialized queue corresponding to a segment of estimated communication durations; and
providing to the device a first estimated wait time for the specialized communications queue based on the segment; and when the permission determination indicates a disapproval:
placing the future communications with the device in a queue separate from the plurality of specialized communication queues; and
providing to the device a second estimated wait time for the queue, the second estimated wait time being less accurate than the first estimated wait time.

10. The system of claim 9, wherein the incoming communication is one of a telephone call, a video chat, an instant messenger chat, and an email.

11. The system of claim 9, wherein the information comprises data from the social network regarding at least one of language preference, gender, education, socio-economic background, race, or age of the user.

12. The system of claim 9, wherein providing the estimated wait time is further based on estimated call durations for other callers in the specialized communications queue.

13. The system of claim 9, wherein, in response to the request, the permission is provided by the user via at least one of a dual-tone multi-frequency tone, a natural language input, a facial expression, or a gesture.

14. The system of claim 9, wherein the device is placed in the specialized communications queue further based on a previous communication duration for the user.

15. The system of claim 9, wherein the device is placed in the specialized communications queue further based on data collected from a previous communication.

16. A computer-readable storage device storing instructions which, when executed by a processor, cause the processor to perform operations comprising:
receiving, at a service center, an incoming communication from a device, the incoming communication regarding a product;
transmitting, to the device, a request for a permission to access information from a social network about a user associated with the device, to yield a permission determination;
when the permission determination indicates an approval:
retrieving, from the social network, the information about the user;
analyzing the information to determine whether the user has a negative attitude towards the product and frequently complains about the product on the social network, to yield an analysis;
when the analysis indicates that the user has the negative attitude towards the product, placing future communications with the device in a specialized communications queue selected among a plurality of specialized communications queues, the specialized queue corresponding to a segment of estimated communication durations; and providing to the device a first estimated wait time for the specialized communications queue based on the segment; and when the permission determination indicates a disapproval:

placing the future communications with the device in a queue separate from the plurality of specialized communication queues; and providing to the device a second estimated wait time for the queue, the second estimated wait time being less accurate than the first estimated wait time.

17. The computer-readable storage device of claim 16, wherein the incoming communication is one of a telephone call, a video chat, an instant messenger chat, and an email.

18. The computer-readable storage device of claim 16, wherein the information comprises data from the social network regarding one of language preference, gender, education, socio-economic background, race, or age of the user.

19. The computer-readable storage device of claim 18, wherein providing the estimated wait time is further based on estimated call durations for other callers in the specialized communications queue.

20. The computer-readable storage device of claim 16, wherein, in response to the request, the permission is provided by the user via at least one of a dual-tone multi-frequency tone, a natural language input, a facial expression, or a gesture.

21. The computer-readable storage device of claim 16, wherein the plurality of specialized communications queues is associated with at least one of age, technical sophistication, emotional state, previous communication duration, education, and language preference.

* * * * *